(12) United States Patent
Hartz

(10) Patent No.: US 11,794,832 B2
(45) Date of Patent: Oct. 24, 2023

(54) TRAILER, IN PARTICULAR FOR A BICYCLE, FOR PROVIDING A USABLE SPACE

(71) Applicant: PETER HARTZ MARKETING GMBH, Bremerhaven (DE)

(72) Inventor: Peter Hartz, Bremerhaven (DE)

(73) Assignee: PETER HARTZ MARKETING GMBH, Bremerhaven (DE)

(*) Notice: Subject to any disclaimer, the term of this patent is extended or adjusted under 35 U.S.C. 154(b) by 231 days.

(21) Appl. No.: 17/210,522

(22) Filed: Mar. 24, 2021

(65) Prior Publication Data

US 2022/0306223 A1 Sep. 29, 2022

(51) Int. Cl.
*B62D 63/06* (2006.01)
*B62K 27/00* (2006.01)
*B60P 3/34* (2006.01)

(52) U.S. Cl.
CPC .............. *B62D 63/061* (2013.01); *B60P 3/34* (2013.01); *B62K 27/003* (2013.01)

(58) Field of Classification Search
CPC ....... B62D 63/061; B62K 27/003; B60P 3/32; B60P 3/34; E04H 1/005; E04H 1/008
See application file for complete search history.

(56) References Cited

U.S. PATENT DOCUMENTS 3,168,343 A * 2/1965 Marcel ..................... B60P 3/34
296/156
3,556,581 A * 1/1971 Silva ........................ B60P 3/34
296/26.06

(Continued)

FOREIGN PATENT DOCUMENTS

DE          42 257 A   12/1965
DE     296 13 150 U1   10/1996

(Continued)

OTHER PUBLICATIONS

Company Website: "B-Turtle Camping Fahrradanhänger—B-Turtle: Der Microcaravan für E-Bikes", https://web.archive.org/web/20180906064211/https://gentletent.com/shop/b-turtle/ (retrieved Sep. 6, 2018), English Translation of the relevant pages.

(Continued)

*Primary Examiner* — Gregory A Blankenship
(74) *Attorney, Agent, or Firm* — Norman B. Thot

(57) ABSTRACT

A trailer for providing a usable space. The trailer includes a wheeled underframe with a base element which is at least partially open at a top, a roof element with a roof surface and four adjacent side walls, and a connection element which connects the base element to the roof element in a set-up state. The connection element has an upper surface with at least two adjacent, opposite side walls. In a travel state, the roof element surrounds the connection element and the base element from an outside at the top and at least partially at the sides. To provide the set-up state of the trailer, the roof element extends a dimension of the base element by being erected substantially vertically, and the connection element increases a height of the base element by being erected, so as to provide a firmly enclosed usable space in an interior of the trailer.

12 Claims, 2 Drawing Sheets

(56) References Cited

U.S. PATENT DOCUMENTS

| | | | | |
|---|---|---|---|---|
| 3,807,789 | A * | 4/1974 | Turquin | B60P 3/32 |
| | | | | 296/168 |
| 3,830,541 | A * | 8/1974 | Bowman | B60P 3/34 |
| | | | | 52/64 |
| 3,838,880 | A | 10/1974 | Lefebvre | |
| 3,879,240 | A * | 4/1975 | Wall | B60P 3/32 |
| | | | | 264/46.7 |
| 4,114,942 | A * | 9/1978 | Greiner | B60P 3/34 |
| | | | | 296/26.11 |
| 4,546,578 | A * | 10/1985 | Behrmann | E04B 1/34336 |
| | | | | 52/79.5 |
| 5,653,494 | A * | 8/1997 | Cleall | B60P 3/34 |
| | | | | 296/181.3 |
| 10,183,608 | B2 * | 1/2019 | Knight | B60P 3/341 |
| 11,686,119 | B1 * | 6/2023 | Huang | B62K 27/003 |
| | | | | 135/88.13 |
| 2002/0063442 | A1 * | 5/2002 | Voas | B62K 27/003 |
| | | | | 296/181.5 |
| 2007/0221324 | A1 * | 9/2007 | Monk | B29C 44/569 |
| | | | | 156/308.2 |
| 2009/0151137 | A1 * | 6/2009 | Darling, III | B62D 63/061 |
| | | | | 24/568 |
| 2016/0083030 | A1 * | 3/2016 | Marchetti | B62D 63/061 |
| | | | | 280/42 |
| 2017/0197683 | A1 * | 7/2017 | Kilcrease | B62K 27/12 |
| 2018/0258658 | A1 * | 9/2018 | Cruz | E04H 1/1205 |
| 2019/0118670 | A1 * | 4/2019 | Vallier | B60L 15/42 |
| 2020/0189684 | A1 * | 6/2020 | Engel | B62K 27/003 |
| 2021/0129732 | A1 * | 5/2021 | Wroge | B62K 27/003 |
| 2021/0188025 | A1 * | 6/2021 | Drossel | B62B 5/06 |
| 2022/0138807 | A1 * | 5/2022 | Penaflor | G06Q 30/0277 |
| | | | | 705/14.73 |
| 2022/0306223 | A1 * | 9/2022 | Hartz | B62K 27/003 |

FOREIGN PATENT DOCUMENTS

| | | | | |
|---|---|---|---|---|
| EP | 3842329 | * | 12/2020 | B62D 63/061 |
| FR | 932458 | A * | 8/1946 | B60P 3/34 |
| FR | 932458 | A | 3/1948 | |
| FR | 1001152 | A | 2/1952 | |
| FR | 1498631 | A * | 9/1966 | B60P 3/34 |
| FR | 2 573 706 | A1 | 5/1986 | |
| GB | 885586 | A | 12/1961 | |
| GB | 1 001 952 | A | 8/1965 | |
| GB | 2 062 047 | A | 5/1981 | |
| GB | 2460126 | A * | 11/2009 | B60P 3/32 |

OTHER PUBLICATIONS

Youtube-Video: "B-Turtle Camping Fahrradanhänger:" https://www.youtube.com/watch?v=nFKTUa1eAKg (retrieved Oct. 28, 2020), English Translation of the relevant parts.

Youtube-Video: "CAMPWERK Economy Zeltanhänger / Faltcaravan /Anhängerzelt Aufbau: https://www.youtube.com/watch?v=pgrqKwJE1ek" (retrieved on Oct. 28, 2020), English Translation of the relevant parts.

Youtube-Video: Der Campingwagen fürs Fahrrad: https://www.prosieben.de/tv.galileo/videos/2015234-der-campingwagen-fuers-fahrrad-clip (retrieved on Oct. 28, 2020), English Translation of the relevant parts.

* cited by examiner

TRAILER, IN PARTICULAR FOR A BICYCLE, FOR PROVIDING A USABLE SPACE

FIELD

The present invention relates to a trailer, in particular for a bicycle, for providing a usable space, the trailer comprising a wheeled underframe comprising a base element, a roof element, and a connection element for connecting the base element to the roof element in a set-up state, the base element being at least partially open at the top, the roof element comprising a roof surface having four adjacent side walls, and the connection element comprising an upper surface having at least two adjacent, opposite side walls.

BACKGROUND

As the use of bicycles and E-bikes in everyday life and for leisure has increased, the demands placed on bicycle trailers have also increased. In addition to trailers for children, dogs, and for transporting loads, an increasing need exists for a trailer having an increased volume of usable space for use as a sales trailer and/or as a caravan or sleeping trailer.

Previously described trailers are in particular unsuitable for long bicycle trips since they have a high service weight of over 40 kg and have an excessively high wind load due to tall attachments, so that the cyclist quickly reaches the limits of their physical capacity.

In addition to bicycle trailers comprising tall attachments that are susceptible to wind and to tipping over, trailers have also been described in which tarpaulins are set-up on a base frame via rods or inflatable tubes in order to provide a camping space for living and/or sleeping. A drawback thereof is the set up time required of approximately 30 minutes as well as packing away wet tarpaulins when it rains before an onward journey. A bicycle trailer has also been described in which an upper, curved half-shell is connected to a lower, curved hard shell via a hinge which can be opened out towards the rear. As a result, however, headroom is not provided.

DE 296 13 150 U1 describes a bicycle trailer for transporting small children comprising two identically constructed shell parts in which the upper shell part in the form of a cover can be opened up vertically and rests on the rear side wall of the lower shell part when opened up.

U.S. Pat. No. 3,838,880 describes a folding house trailer comprising two box-like end portions, with one end portion covering the other end portion when folded up. The two box-like end portions are connected by a plurality of foldable side walls and roof elements in the erected state.

A need therefore exists for a compact trailer during travel which provides sufficient space for use during downtime when not travelling.

SUMMARY

An aspect of the present invention is to improve upon the prior art.

In an embodiment, the present invention provides a trailer for providing a usable space. The trailer includes a wheeled underframe comprising a base element which is at least partially open at a top, a roof element comprising a roof surface and four adjacent side walls, and a connection element which is configured to connect the base element to the roof element in a set-up state. The connection element comprises an upper surface which comprises at least two adjacent, opposite side walls. In a travel state, the roof element is configured to surround the connection element and the base element from an outside at the top and at least partially at the sides. To provide the set-up state of the trailer, the roof element is configured to extend a dimension of the base element by being erected substantially vertically, and the connection element is further configured to increase a height of the base element by being erected, so as to provide a firmly enclosed usable space in an interior of the trailer.

BRIEF DESCRIPTION OF THE DRAWINGS

The present invention is described in greater detail below on the basis of embodiments and of the drawings in which.

DETAILED DESCRIPTION

Figure 1:
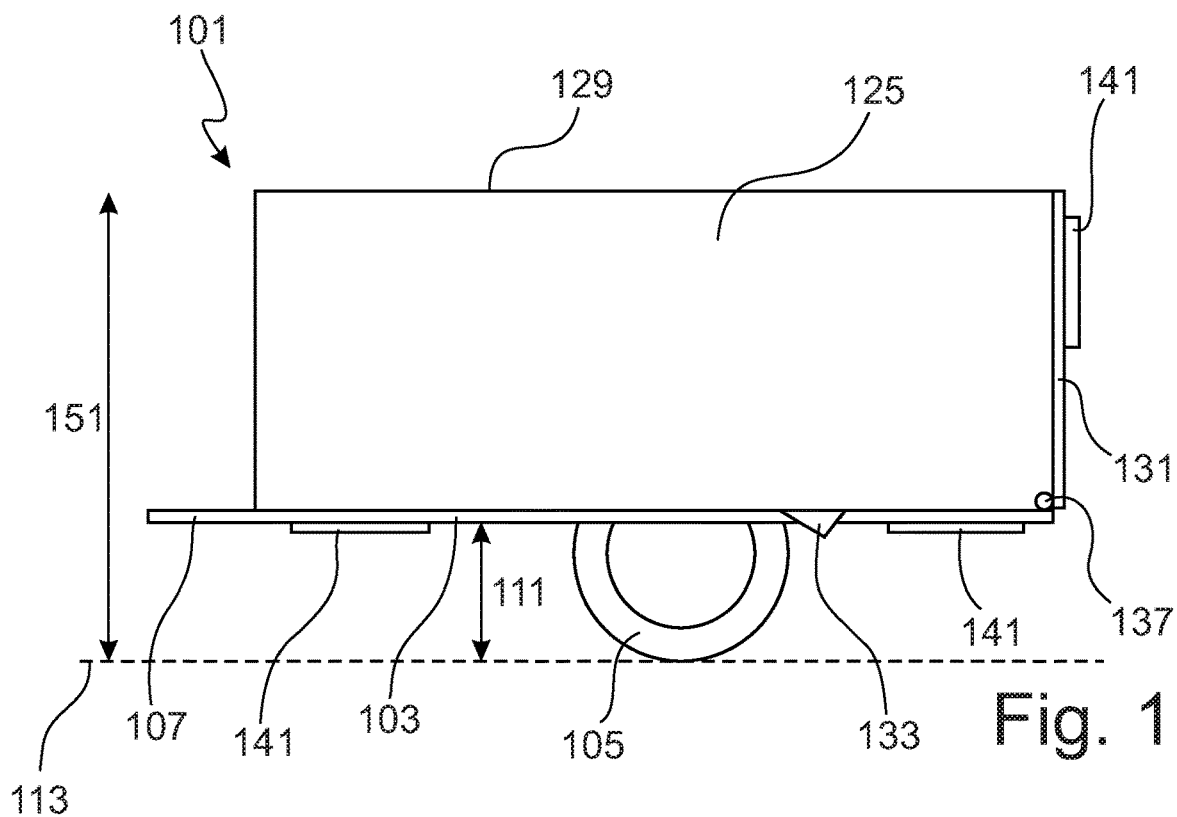
FIG. 1 shows a highly schematic side view of a bicycle trailer in the travel state.

The present invention provides a trailer, in particular for a bicycle, for providing a usable space, the trailer comprising a wheeled underframe comprising a base element, a roof element, and a connection element for connecting the base element to the roof element in a set-up state, the base element being at least partially open at the top, the roof element comprising a roof surface having four adjacent side walls, and the connection element comprising an upper surface having at least two adjacent, opposite side walls, and, in a travel state, the roof element surrounding the connection element and the base element from the outside at the top and at least partially at the sides and, in order to reach the set-up state of the trailer, the roof element and the connection element being configured so that the roof element extends a dimension of the base element by being erected substantially vertically and the connection element increasing the height of the base element by being erected, so that a firmly enclosed usable space is provided in the interior of the trailer.

A trailer that is in particular for a bicycle is therefore provided which can be used optimally both in the travel state and in the set-up state since the trailer is very compact in the travel state but provides sufficient space, for example, as a camping trailer, in the set-up state.

The compact travel state is in particular achieved in that first the connection element and then the roof element are arranged on the base element in a stacked manner, the roof element being arranged on the outside around the connection element and the base element. The roof element here surrounds the connection element and the base element, for example, completely at the top and at least partially at the sides. Owing to the compact, stacked arrangement of just three elements, i.e., the base element, the connection element and the roof element, a tall construction and thus susceptibility to wind or to tipping over is prevented during travel.

This ensures road safety and also complies with traffic regulations.

By contrast, in the set-up state of the trailer when not travelling, the space inside the trailer is enlarged by the height being increased by erecting the roof element that is at the top of the stack substantially vertically and by increasing a dimension of the base element and thus increasing the length and/or width of the trailer, and by erecting the connection element so that it connects the base element and the erected roof element so as to abut said elements and to increase the height of the base element present in the travel state, in this region. Headroom is provided as a result, in particular in the entrance region of the trailer for a bicycle. A trailer made up of just three rigid, three-dimensionally shaped elements (roof element, base element, connection element) is therefore provided in which, when erecting the roof element, a dimension of the base element is extended and, by erecting the roof element and the connection element, the height of the base element is increased. In the erected state, the three elements made of a rigid, dimensionally stable material provide a protected camping space and therefore sheets or tarpaulins are not used.

A usable space is therefore provided in the set-up state which persons can access and which can be used for living and/or sleeping. It is particularly advantageous that the trailer can be transferred from the travel state into the set-up state, or vice versa, in just minutes, in particular about 10 minutes, for example, about 5 minutes, and that the three elements can be erected or stacked together with just a few movements.

In the travel state, a smaller construction than known bicycle trailers is produced as a result, while in the set-up state, a sufficiently large usable space which is firmly enclosed is provided in a simple manner.

An essential concept of the present invention is based on the fact that, via three rigid, accordingly three-dimensional elements (the base element, the connection element and the roof element), a compact stacking of these elements with the roof element forming a cover is provided for the travel state, while, for the set-up state, for providing a larger usable space than the interior of the trailer in the travel state, the roof surface of the roof element is erected vertically so that the roof element extends a dimension of the base element and the connection element is vertically erected between the base element and the roof element, which is now vertically erected in a higher position, so that the connection element connects the lower height of the base element and the higher height of the vertically erected roof element. A sufficiently large usable space that is firmly enclosed by the base element, the connection element and the roof element is therefore provided.

The following terms are explained:

A "trailer" is in particular understood to be a vehicle which has a load bed and/or a loading chamber for transportation, but which does not have its own main drive. The trailer is in particular towed behind a towing vehicle, such as a motorcycle or a bicycle. The interior space in the trailer in the travel state is in particular smaller than the usable space provided in the set-up state. The trailer in particular comprises a wheeled underframe, the base element, the connection element and the roof element. The tractive forces are in particular transmitted from the towing vehicle, via a drawbar, to the trailer. A trailer coupling is used in particular to provide a connection between the towing vehicle and the trailer. A trailer may in particular be a transport trailer, a cargo trailer, a sales trailer, a camping trailer, a caravan, a sleeping trailer and/or another trailer. A trailer may also be a semi-trailer, for example, having a tongue weight in a range of from 0.3 to 6.5 kg.

A "wheeled underframe" (also called a "chassis") is in particular understood to mean the load-bearing parts of the trailer. The wheel suspensions, the trailer coupling and/or drawbar, the trailer electronics and optionally an auxiliary motor are in particular fastened to the underframe. The underframe furthermore receives the base element and is connected thereto. The wheel suspensions, the trailer coupling and the above-mentioned additional components of an underframe are alternatively, however, also fastened directly to the base element, so that the underframe itself can be dispensed with.

The trailer is particularly suitable for use with a bicycle. The trailer can of course also be towed behind any other towing vehicle, such as a car, a tractor, a motorcycle or any other motorized vehicle.

A "bicycle" is in particular an at least two-wheeled, usually one-track land vehicle, which is driven by the muscular strength of a person thereon by turning pedals or moving hand cranks. A bicycle may also be a bicycle comprising an electric auxiliary motor, such as an E-bike, electric bicycle or pedelec. A bicycle is also understood to mean a recumbent bicycle or a trike.

The "base element" is in particular a three-dimensional element and the lowermost element of the trailer, which rests on the underframe and is connected thereto. The base element in particular comprises a rigid and/or dimensionally stable material. The base element in particular comprises a base panel and/or a load bed, which can, for example, be surrounded by four side walls. The base element is either completely or partially open at the top. The base element can, for example, comprise a roof surface at the top in part, as far as the point at which the connection element is erected. The base element may furthermore comprise a storage space and/or a reinforcement. The base element in particular has a trough-like basic shape. On the side opposite the travel direction or at which the roof element is erected, the base element in particular comprises a side wall having a lower height than the other side walls, or this side wall is designed as a hinged rear wall or side wall. The trailer may also not have a rear wall opposite the travel direction or may not have a side wall on the side at which the roof element is vertically erected.

The "connection element" is in particular a three-dimensional element and in particular has an upper surface having at least two adjoining, opposite side surfaces. The connection element in particular comprises a rigid and/or dimensionally stable material. The roof element in particular has a triangular basic shape. In the set-up state, the upper surface can, for example, adjoin a roof surface of the base element on one side and adjoin the roof surface of the roof element on the other side. The two opposite side walls of the connection element can, for example, be arranged in parallel with one another and, in their longitudinal orientation, lie in the direction in which the base element is extended by the vertically erected roof element. The two opposite side walls need not necessarily be arranged in parallel with one another, however, and may instead also taper upwards towards one another so that a triangular shape is formed in cross section. The upper surface (roof surface) of the connection element in this case merely corresponds to the edge at which the two side walls tapering towards one another meet.

The "roof element" is in particular a three-dimensional element which, in the travel state, has a substantially horizontally oriented roof surface having four adjoining side walls. The roof element can, for example, surround the connection element and/or the base element from the outside at the top and at the sides. In order to provide sufficient height in the set-up state, however, the connection element may also extend beyond the roof element and/or the base element in the travel state and may thus extend as far as the region of the underframe, as long as it does not touch the ground. The roof element in this case does not completely surround the stacked connection element in the lower region when in the travel state. The roof element in particular has a box-like basic shape that is open towards the bottom. In the set-up state, the roof element stands upright on one of its side surfaces from the travel state in particular and/or stands upright beside the base element. The roof element in particular comprises a rigid and/or dimensionally stable material.

A "travel state" is in particular understood to mean that the trailer is moving on wheels. The trailer is in particular being towed by a towing vehicle in a travel state.

A "set-up state" of the trailer is in particular understood to mean that the trailer is not travelling and that the trailer is thus stationary. In the set-up state, the firmly enclosed usable space in the interior of the trailer is enlarged, in particular by erecting the roof element and the connection element. In the set-up state, the trailer in particular has headroom, in particular of greater than 160 cm, for example, of greater than 170 cm, for example, of greater than 180 cm.

"Vertically erecting" is in particular understood to mean that the roof element that is substantially horizontally oriented in the travel state and thus the roof surface that is substantially horizontally oriented are arranged in a vertical orientation in the set-up state. In this case, the vertically erected roof element in particular rests on one of its side walls. Depending on whether the roof element is erected vertically at the front or the rear of the trailer or to the right or the left of the trailer in the towing direction, the vertically-erected roof element accordingly rests on a side surface of the width or the length of the roof element. Since the corresponding, now abutting side wall of the base element has a lower height than the now vertically erected roof element and/or a corresponding opening, the interior cavity in the base element and the interior cavity in the roof element transition directly into one another at this point, and the usable space is directly enlarged. The roof element may of course, however, also be erected on the base element itself and may thus stand upright on the base element at a side surface.

"Erecting substantially vertically" is understood to mean that an angle of 90° of the erected roof element relative to the ground need not necessarily be adhered to, but instead this angle may also here deviate.

"Erecting the connection element" is in particular understood to mean that the upper surface (roof surface) and the two adjoining, opposite side surfaces of the connection element are moved into the height so that they adjoin the roof surface and the corresponding side walls of the base element on one side and adjoin the vertically erected roof element on the other side, so that a firmly enclosed usable space is present in the interior of the trailer, the height of which is increased from one side of the trailer substantially having the height of the base element, through the height of the connection element, up to the height of the roof element. A usable space is therefore provided which is accessible at least from the side of the roof surface (in the travel state) of the vertically erected roof element in the erected state.

A "usable space" is in particular understood to mean a cavity in the interior of the trailer which can be used for an appropriate intended purpose. The usable space may in particular be used as a living and/or sleeping space, a storage space, a sales space, a transport space, or in another way.

"Firmly enclosed" is in particular understood to mean that the usable space is surrounded by solid walls, and that "windows" made of film material may also be provided.

In an embodiment of the trailer, the roof element and/or the connection element can be erected by a sliding mechanism, a rotary mechanism, a folding mechanism and/or a pivoting mechanism.

The roof element and/or the connection element can therefore be erected in a simple manner by a user applying a movement direction and/or force to the roof element or the connection element.

A "sliding mechanism" is in particular a component or a plurality of components which make it possible to move and thus slide the roof element and/or the connection element on a predetermined path. A sliding mechanism can, for example, be a sliding rail and/or a guide rail.

A "rotary mechanism" is in particular a component or a plurality of components which apply a rotary movement to the roof element and/or the connection element. A rotary mechanism can, for example, be a hinge and/or a joint that can rotate about an axis.

A "folding mechanism" is in particular understood to be a component or a plurality of components which make it possible to rotate the roof element and/or the connection element about a stationary, horizontal rotational axis.

A "pivoting mechanism" is in particular understood to be a component or a plurality of components which allow a movement about an axis or a point on the roof element or the connection element in a certain angular range. Pivoting may be a horizontal, an oblique and/or a vertical movement. The pivoting movement may in this case in particular also assume a curved form.

In order to extend the trailer in its longitudinal direction in the set-up state and thus to extend the usable space in the longitudinal direction, in the set-up state, the roof element is erected substantially vertically in its longitudinal dimension of the roof surface, so that a length of the base element is extended in a longitudinal direction of the trailer by a side wall of the roof element.

The roof element in this case is therefore vertically positioned in the longitudinal direction of the trailer and is thus arranged either at the front of the trailer or at the rear of the trailer, and, as a result, extends the length of the base element and thus the length of the usable space compared with the travel state. Since the roof element usually has a longer dimension in the longitudinal direction of the trailer and thus in the direction of travel than in the transverse direction, the vertically-erected roof element then stands upright with its longer longitudinal dimension and has a considerably taller height than the base element. This tall height of the vertically-erected roof element is guided down in the forward direction until it reaches the height of the base element and the side surfaces of the base element by erecting the connection element and its upper surface (roof surface) and/or its side walls in the towing direction.

"Longitudinal dimension" is in particular understood to mean the longest dimension of the roof surface and thus of the roof element.

The "longitudinal direction" is in particular the longest extension of the trailer. The "longitudinal direction" is in particular oriented in the towing direction.

It is noted in this respect that, in particular with a removable drawbar, the roof element can, for example, also be erected vertically in front of the front wall of the base element and thus at the front of the trailer in the travel state.

In an embodiment of the trailer, in the set-up state, the roof element can, for example, be positioned substantially vertically upright in its width dimension of the roof surface, so that a width of the base element is extended transversely to the longitudinal direction of the trailer by a side wall of the roof element.

In the set-up state, a larger width of the trailer is therefore produced by the roof element being vertically erected either to the left side or to the right side of the base element. The width dimension of the roof surface in this case therefore stands up vertically and the usable space is enlarged at the sides.

The "width dimension" is in particular the longest dimension of the width of the roof surface and thus of the roof element. The width dimension is in particular transverse to the longitudinal dimension.

In order to provide a service weight of the trailer of <40 kg and to thus make longer travel distances possible, the base element, the connection element and/or the roof element comprise a plastics panel, in particular a plastics panel with a sandwich construction.

The trailer having a lightweight construction therefore has the option of a high load capacity owing to its low service weight. The trailer can accordingly, for example, be equipped with furniture as a caravan and/or sleeping trailer.

A "plastics panel" is in particular a panel which comprises a plastics material. The plastics panel in particular has high strength and a low weight. The plastics panel in particular has a sandwich construction having multiple layers. The sandwich construction in particular has the sequence "outer layer—core—outer layer". For example, in the sandwich construction, the plastics panel has two solid surfaces at the top and bottom, between which a lighter inner layer is arranged. This lighter core can, for example, consist of a solid material, such as polyethylene, foam, an insulating material and/or a honeycomb grid, made, for example, of cardboard or a plastics material. The plastics panel can, for example, be a thermoplastic sandwich panel which has a polypropylene honeycomb core and fiber-glass-reinforced polypropylene outer layers at the top and bottom, which are materially bonded evenly and consistently by melt lamination. The plastics material in particular has a weight in a range of from 2.50 to 7.00 kg/m$^2$, for example, of 3.8 kg/m$^2$.

By constructing the roof element, the connection element and the base element via a corresponding plastics panel, the trailer has a service weight of <40 kg, in particular <35 kg, for example, <30 kg. The trailer is therefore easier to handle and maneuver.

The base element, the connection element and/or the roof element can, for example, comprise a sealing material, so that the plastics panels are sealed against one another in the set-up state and therefore the trailer is windproof and/or waterproof.

In an embodiment of the trailer, the plastics panel can, for example, have a material thickness in a range of from 10 mm to 50 mm, in particular of from 15 mm to 40 mm, for example, of from 20 mm to 35 mm.

A sufficient material thickness is provided as a result with regard to strength and load-bearing capacity, in particular of the base element, without the service weight of the trailer being unnecessarily increased. The base element, the connection element and/or the roof element may here have the same material thickness or different material thicknesses.

In order for it to be possible to optimally erect the roof element vertically and/or to optimally use the trailer, the roof element comprises a reinforcing panel, a stand, a door and/or a fastening rod, and/or the base element comprises a stand.

It is particularly advantageous for the roof element to comprise a reinforcing panel on the outside of the side wall, which panel is arranged towards the ground when the roof element is oriented vertically and thus constitutes the standing surface in the set-up state. A stand that is, for example, hinged may additionally be arranged on this side wall and/or the reinforcing panel, so that the roof element stands on the ground via this side wall and/or reinforcing panel and via the stand.

The roof element can, for example, comprise a door on the side of the vertically-erected roof surface, so that the usable space in the interior of the trailer can be accessed by a person. A fastening rod that can be folded out, for example, may likewise be arranged on the roof surface in order to make it possible to hang up a tarpaulin and/or awning in front of the erected roof element and/or the door of the trailer in the set-up state. Part of the roof surface or the entire roof surface may equally be designed to be folded out so that, after the roof element is erected vertically, the part of or the entire roof surface is oriented horizontally by being folded out, thus forming a canopy. The part of or the entire roof surface is here supported in the horizontal orientation by a transverse rod that can be folded out or pulled out.

In order to increase the stability of the trailer, it is particularly advantageous for the base element to comprise at least one stand, for example, four stands, one at each corner, which can, for example, be folded out or which can be inserted into the base element from below.

It is also advantageous for the trailer, the roof element, the connection element and/or the base element to comprise additional components, such as windows and/or a fold-out camping table on the outside, depending on the use in question.

In an embodiment, in the travel state, the trailer can, for example, have a height of <0.90 m, in particular of <0.85 m, for example, of <0.80 m.

In the travel state, the trailer therefore has a low height, which is below the height of a standard luggage rack of a bicycle. The luggage rack can therefore be optimally loaded and used without interfering with the trailer arranged therebehind. The cyclist also has a clear view to the rear while cycling.

Due to its low height of <90 cm, the trailer in particular has low wind resistance and a low susceptibility to tipping over in the event of cross winds, and can therefore also be used for long bicycle trips without any limitations.

In order to further minimize the wind resistance of the trailer, to make it possible to maneuver the trailer and/or to comply with relevant traffic regulations, in the travel state, the trailer has a width of <1.00 m, in particular of <0.95 m, for example of <0.90 m, and/or a length of <1.70 m, in particular of <1.60 m, for example, of <1.50 m.

With a motor-driven towing vehicle, the trailer may also have a greater width, for example, a width of <1.30 m.

Since the length of the trailer in the travel state is extended in the set-up state by arranging the roof element in a vertical orientation at the front or the rear of the trailer in the longitudinal direction of the trailer, even at a short length of <1.60 m, a sufficient length is provided by the extension by the roof element, for example, for a person to be able to sleep stretched out in the trailer. A reclining area having a length in a range of from 1.80 m to 2.20 m can therefore, for example, be provided.

In the set-up state, the trailer in particular provides a usable area in a range of from 2.0 m$^2$ to 8 m$^2$, for example, of from 3.0 to 7.0 m$^2$.

In an embodiment, the trailer can, for example, comprise an electric drive and/or an energy-storage unit and/or an energy-generating unit.

When the electric drive is, for example, configured as an auxiliary motor, an assistive forward movement can as a result be generated when the trailer has a heavy load. Via an energy-storage unit and/or an energy-generating unit, consumers in the trailer, such as a hob when the trailer is designed as a caravan and/or safety lighting (tail lights) of the trailer, can be supplied with power. The energy-storage unit and/or energy-generating unit can also be used to charge a rechargeable battery of an E-bike which is towing the trailer.

An "electric drive" is in particular a drive comprising one or more electric motors. An electric drive may in particular be used as an auxiliary motor in addition to the tractive force from a towing vehicle. An auxiliary motor is, for example, activated on a steep incline on the route in order to prevent the trailer, owing to its weight, from applying a counter tractive force backwards due to the slope.

An "energy-storage unit" is in particular a storage device for currently available but not required energy for later use. An energy-storage unit can, for example, be an accumulator or a battery. An "energy-generating unit" is in particular an energy converter which exchanges energy between the surroundings and the trailer in at least two energy forms. The energy-generating unit can, for example, be a regenerative brake which transforms the kinetic energy during braking into electrical energy, or a solar panel on the roof of the trailer which converts sunlight directly into electrical energy.

The present invention will be explained in greater detail below on the basis of an exemplary embodiment shown in the drawings.

A bicycle trailer 101 comprises an underframe 103 having a wheel 105 on either side. The wheels 105 rest on the ground 113. The bicycle trailer 101 has a ground clearance 111 of 29 cm. In the travel state, the bicycle trailer 101 also has a height 151 of 80 cm and a width 155 of 88 cm.

The bicycle trailer 101 comprises a cover part 125 having a roof 129, as is visible from the outside (FIG. 1). At the front of the bicycle trailer 101, a drawbar 107 is attached to the underframe 103 and a collapsed folding leg 141 is attached to each corner on the underside. On its rear side and thus the side opposite the drawbar 107, the cover part 125 comprises a reinforcing panel 131 to which another folding leg 141 is attached. A swivel hinge 137 continuously extends over the entire width of the cover part 125 on the inside of the cover part 125. A connection part 123 is arranged below the cover part 125, of which connection part 123, in the travel state, only a corner of a side wall 133 of the connection part 123 is visible from the outside in the side view (see FIG. 1).

Figure 2:
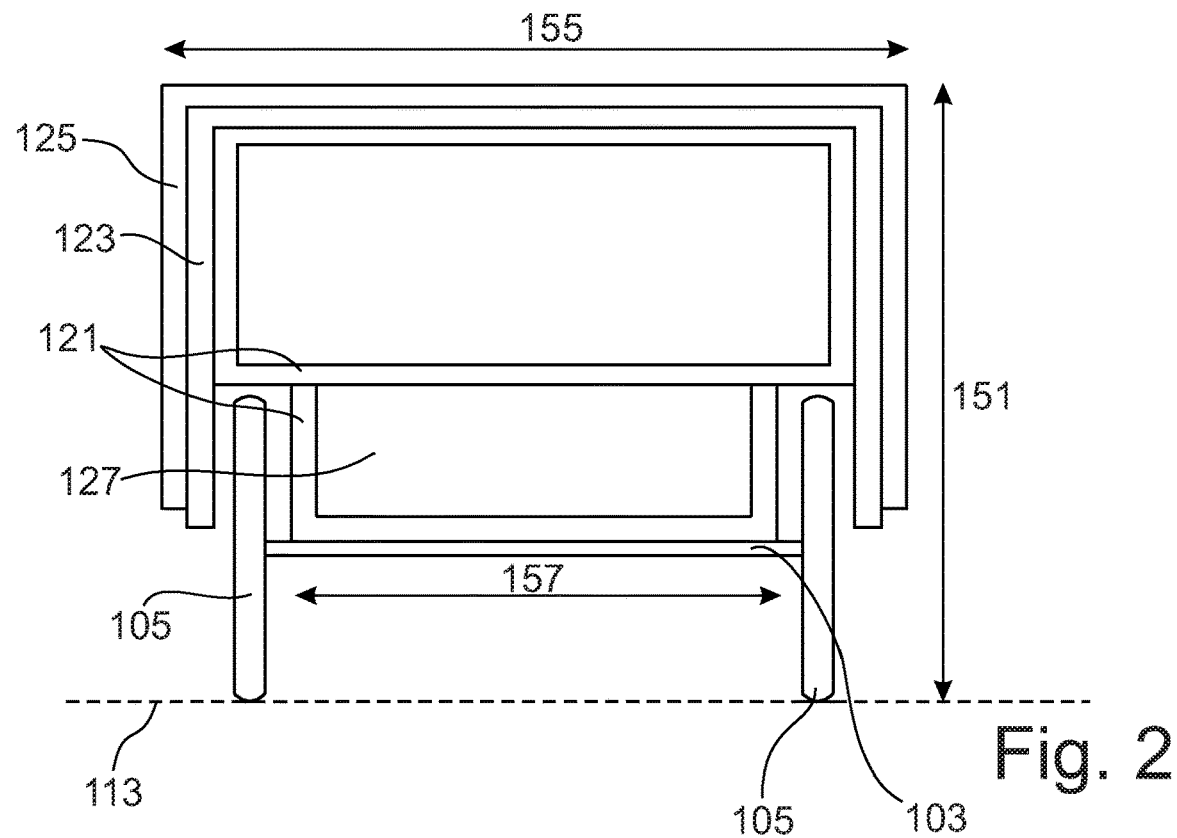
FIG. 2 shows a highly schematic cross section through the bicycle trailer in the front region in the travel state.

The cover part 125 and the connection part 123, which are stacked on top of one another, rest on a base part 121, which comprises a storage space 127 (see FIG. 2). The base part 121 in turn rests on the underframe 103 and is rigidly connected thereto. The storage space 127 is arranged between the wheels 105 and has a width of 62 cm.

The cover part 125, the connection part 123, and the base part 121 are made of polypropylene panels which have a honeycomb core, and each have a material thickness of 25 mm. The bicycle trailer 101 therefore has a low service weight of 38 kg.

The following operations are carried out with the bicycle trailer 101:

The bicycle trailer 101 is fastened to a bicycle (not shown) by a drawbar 107 and a trailer coupling (not shown) and is then towed by a cyclist via a bicycle during a bicycle trip. At the destination, the bicycle trailer 101 is accordingly uncoupled by the cyclist via the trailer coupling and, in order to increase the stability and load-bearing capacity, the folding legs 141 on the underside of the underframe 103 are folded out to the ground. The cover part 125 is then opened up towards the rear via the swivel hinge 137, and the folding leg 141 on the reinforcing panel 131 of the cover part 125 is folded out so that the cover part 125 stands on the ground 113 via the reinforcing panel 31 and the folding leg 141.

By erecting the cover part 125 to be vertical as described, the roof 129 of the cover part 125 is vertically oriented in its longitudinal orientation and the cover part 125 has a height 161 of 1.73 m in this set-up state.

Once the cover part 125 has been vertically erected, the connection part 123 is grasped by its side wall 133 while still in the travel state and, via a sliding rail comprising pivot pins 139, is moved backwards, away from the drawbar 107, and upwards owing to a sliding and rotating movement 145, by pulling the side wall 133, so that the side wall 143 is positioned between the rear, erected cover part 125 and the front part of the base part 121 in the set-up state, and the height of the base part 121 continuously increases towards the cover part 125.

Figure 3:
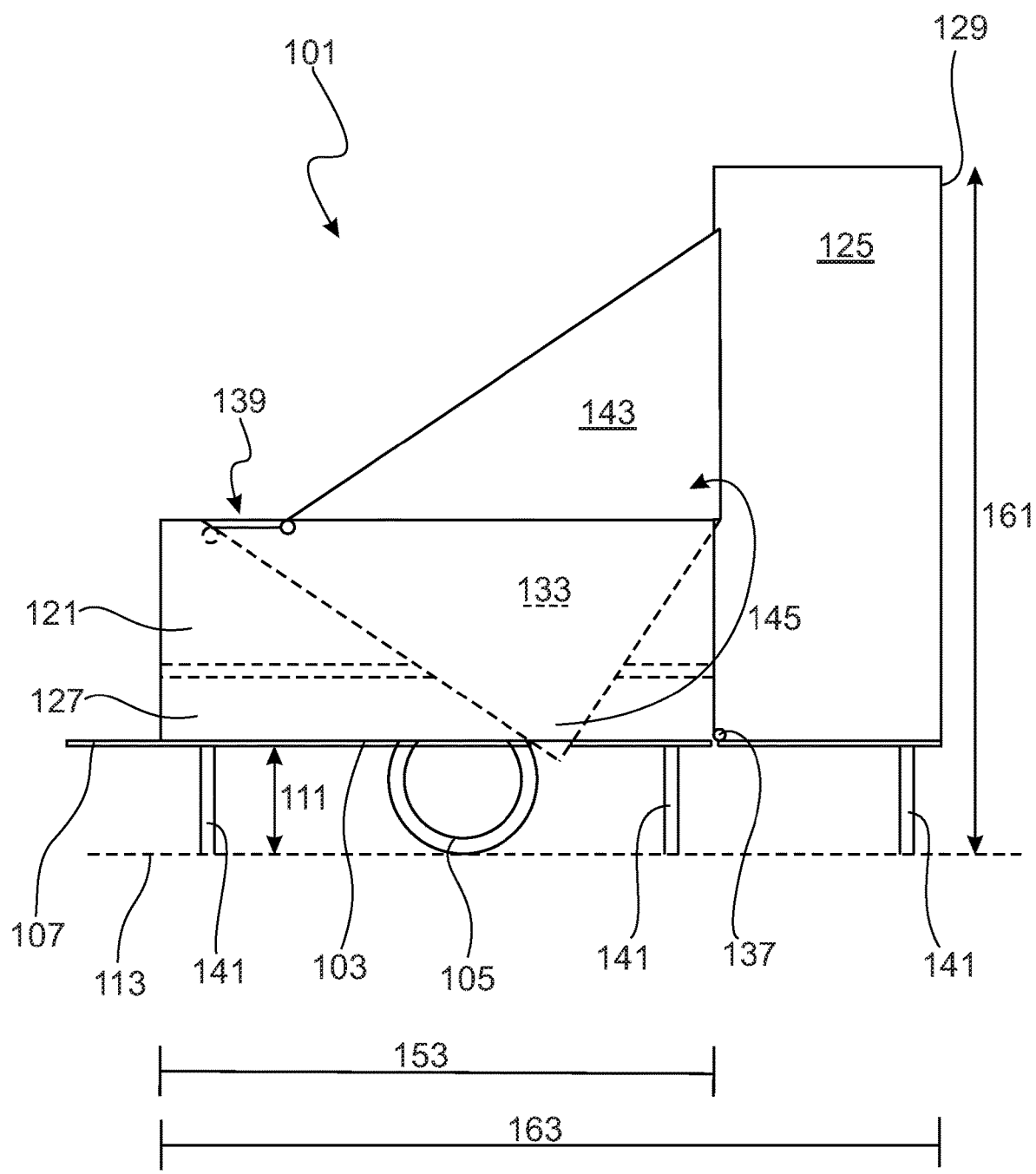
FIG. 3 shows a highly schematic side view of the bicycle trailer in the set-up state.

In the set-up state, the base part 121, the connection part 123, and the cover part 125 are sealed against one another in a windproof and weather-proof manner by seals (not shown in FIG. 3) so that a large, firmly enclosed usable space is provided in the interior of the bicycle trailer 101. By opening up the cover part 125 towards the rear, the length of the bicycle trailer 153 in the travel state has been extended from 1.28 m to a length of the bicycle trailer 163 in the set-up state of 1.80 m.

The cyclist accesses the interior of the cover part 125, and thus the bicycle trailer 101 in the set-up state, through a door (not shown in FIG. 3) in the roof 129 of the erected cover part 125. The cyclist then places a cushion that is located in the interior onto the base of the cover part 125 at the same height as the upper face of the storage space 127 and thus has a reclining area of about 1.80 m for sleeping.

A bicycle trailer 101 is therefore provided which is very compact in the travel state owing to stacking the base part 121, the connection part 123, and the cover part 125 with small dimensions and which allows for a sufficiently large living space by simply moving and orienting the cover part 125 and the connection part 123 relative to the base part 121 of the bicycle trailer 101.

The present invention is not limited to embodiments described herein; reference should be had to the appended claims.

LIST OF REFERENCE NUMERALS

101 Bicycle trailer
103 Underframe
105 Wheel
107 Drawbar
111 Ground clearance
113 Ground
121 Base part
123 Connection part
125 Cover part
127 Storage space
129 Roof (of the cover part 125)
131 Reinforcing panel
133 Side wall (of the connection part 123—travel state)
137 Swivel hinge
139 Sliding rail comprising pivot pins
141 Folding leg
143 Side wall (of the connection part 123—set-up state)

145 Sliding and rotating movement
151 Height of the bicycle trailer (travel state)
153 Length of the bicycle trailer (travel state)
155 Width of the bicycle trailer (travel state)
157 Width of the storage space 127
161 Height of the cover part 125 (set-up state)
163 Length of the bicycle trailer (set-up state)

What is claimed is:

1. A trailer for providing a usable space, the trailer comprising:
   a wheeled underframe comprising a base element which is at least partially open at a top;
   a roof element comprising a roof surface and four adjacent side walls; and
   a connection element which is configured to connect the base element to the roof element in a set-up state, the connection element comprising an upper surface which comprises at least two adjacent, opposite side walls,
   wherein,
   in a travel state, the roof element is configured to surround the connection element and the base element from an outside at the top and at least partially at the sides,
   to provide the set-up state of the trailer, the roof element is configured to extend a dimension of the base element by being erected substantially vertically, and the connection element is further configured to increase a height of the base element by being erected, so as to provide a firmly enclosed usable space in an interior of the trailer, and
   the base element, the roof element, and the connection element are each formed as a rigid, three-dimensionally shaped element.

2. The trailer as recited in claim 1, further comprising:
   at least one of a sliding mechanism, a rotary mechanism, a folding mechanism and a pivoting mechanism,
   wherein,
   at least one of the roof element and the connection element can be erected via the sliding mechanism, the rotary mechanism, the folding mechanism and the pivoting mechanism.

3. The trailer as recited in claim 1, wherein, in the set-up state, the roof element is erected substantially vertically in a longitudinal dimension of the roof surface so that a length of the base element is extended in a longitudinal direction of the trailer via one of the four adjacent side walls of the roof element.

4. The trailer as recited in claim 1, wherein at least one of the base element, the connection element and the roof element further comprise a plastics panel.

5. The trailer as recited in claim 4, wherein the plastics panel has a material thickness in a range of from 10 mm to 50 mm.

6. The trailer as recited in claim 1, wherein at least one of,
   the roof element further comprises at least one of a reinforcing panel, a stand, a door, and a fastening rod, and
   the base element comprises a stand.

7. The trailer as recited in claim 1, wherein, in the travel state, the trailer has a height of less than 0.90 m.

8. The trailer as recited in claim 1, wherein, in the travel state, the trailer has at least one of,
   a width of less than 1.00 m, and
   a length of less than 1.70 m.

9. The trailer as recited in claim 1, further comprising at least one of:
   an electric drive,
   an energy-storage unit, and
   an energy-generating unit.

10. The trailer as recited in claim 1, wherein the trailer is for a bicycle.

11. The trailer as recited in claim 4, wherein the plastics panel has a sandwich construction.

12. The trailer as recited in claim 1, wherein the trailer is for a motorized vehicle.

* * * * *